D. C. WHITEHURST AND G. W. SHADE.
LOCK FOR AUTOMOBILES.
APPLICATION FILED APR. 3, 1920.

1,402,555.

Patented Jan. 3, 1922.

David C. Whitehurst and George W. Shade, Inventors

By H. G. Burns, Attorney

UNITED STATES PATENT OFFICE.

DAVID C. WHITEHURST AND GEORGE W. SHADE, OF LAKETON, INDIANA.

LOCK FOR AUTOMOBILES.

1,402,555. Specification of Letters Patent. Patented Jan. 3, 1922.

Application filed April 3, 1920. Serial No. 370,969.

*To all whom it may concern:*

Be it known that we, DAVID C. WHITEHURST, and GEORGE W. SHADE, citizens of the United States of America, and residents of Laketon, in the county of Wabash and State of Indiana, have invented certain new and useful Improvements in Locks for Automobiles, of which the following is a specification.

This invention relates to improvements in locks for automobiles and is intended particularly for securing the operating levers of the automobile against operation when applied thereto, and the object of the invention is to provide an attachment adapted to be secured to the car in such position that it may either be locked in interfering position with the control levers or turned to a disengaging position, leaving the levers free and unobstructed.

Figure 1:
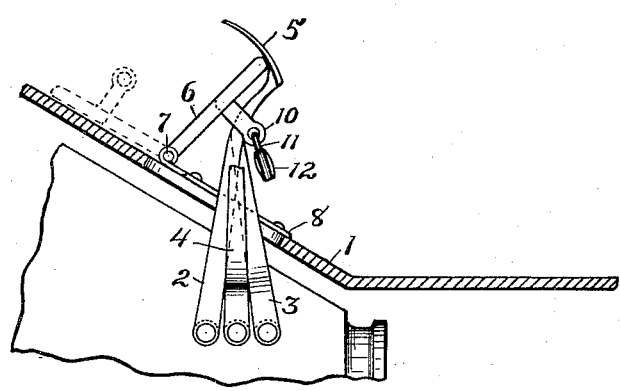
Figure 2:
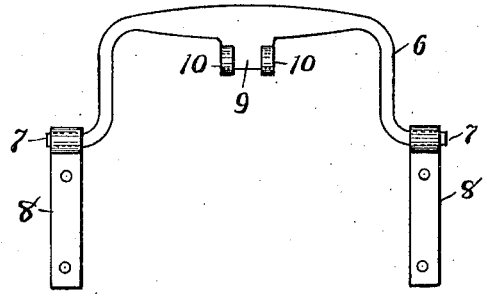

The objects of the invention are accomplished by the construction illustrated in the accompanying drawings in which:

Fig. 1 is a side elevation of the invention in locked relation with the control levers of an automobile, the view showing parts broken away and in section; and Fig. 2 is a plan view of the prop and shackle in connection therewith and its securing members.

Similar characters of reference indicate corresponding parts in both views and having reference now to the same:

1 is the slanting floor of an automobile through which extend a group of control levers 2, 3 and 4, the same being of well known construction and arrangement, each of the levers having a foot plate 5 at its upper end.

The invention is comprised of a U-shaped prop 6, the extremities 7 of which have a common axis, each of which is mounted in a corresponding securing member 8. When applied to the automobile, the securing members are positioned upon the slanting floor 1, one on each side of the group of operating levers and permanently fixed to the floor by any suitable means, and the prop is so proportioned and arranged as to be turned while confined by the securing members and engage each of the group of operating levers beneath their respective foot plates and prevent their operation. The prop has a pendant lug 9 from which extends a pair of perforated shackles 10 so arranged as to embrace one of the operating levers 2, the shackles being so proportioned as to admit the application of a staple 11 of a pad lock 12 through its perforated ends to secure the lever therein. When thus secured all of the operating levers are prevented from operation, the prop being so positioned as to support the foot plates 5 from being moved even though pressed with great force.

When not in use the prop is swung to the position indicated in dotted outline in Fig. 1 where it in no way interferes with the normal operation of any of the levers.

A special feature of the invention is that the device is so constructed that when in locked relation with one of the operating levers a substantial prop is applied to all of the levers so that they are each braced against forced operation.

What I claim is:

In a lock for an automobile having a group of foot control levers, a U-shaped prop each extremity of which has pivotal support in a corresponding securing member attached to the floor of the automobile, and having also a pendent lug provided with a pair of shackles at the lower end thereof adapted to embrace one of the control levers; and means for locking the shackles in connection with the lever, said prop being adapted to engage each of the control levers and brace the same so as to prevent their operation when the prop is in locked position.

In testimony whereof we affix our signatures, in presence of two witnesses.

DAVID C. WHITEHURST.
GEORGE W. SHADE.

Witnesses:
VIOLET WILLIAMS,
GEO. F. OGDEN.